United States Patent
Venkateswaran et al.

(10) Patent No.: US 11,235,224 B1
(45) Date of Patent: Feb. 1, 2022

(54) DETECTING AND REMOVING BIAS IN SUBJECTIVE JUDGING

(71) Applicant: International Business Machines Corporation, Armonk, NY (US)

(72) Inventors: Natesan Venkateswaran, Hopewell Junction, NY (US); Jayapreetha Natesan, Hopewell Junction, NY (US); K. Paul Muller, Wappingers Falls, NY (US); Brian Robert Prasky, Campbell Hall, NY (US); Chunming Lin, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/106,231

(22) Filed: Nov. 30, 2020

(51) Int. Cl.
  *A63B 71/06* (2006.01)
  *G06Q 50/20* (2012.01)
  *G06Q 10/10* (2012.01)

(52) U.S. Cl.
  CPC ..... *A63B 71/0616* (2013.01); *G06Q 50/2053* (2013.01); *G06Q 10/1053* (2013.01)

(58) Field of Classification Search
  CPC ........... A63B 71/0616; G06Q 50/2053; G06Q 10/1053
  See application file for complete search history.

(56) References Cited

U.S. PATENT DOCUMENTS

| | | | | |
|---|---|---|---|---|
| 7,321,858 | B2* | 1/2008 | Andino, Jr. | G06Q 10/10 705/12 |
| 8,109,835 | B2* | 2/2012 | Norris | A63B 69/004 472/93 |
| 10,521,420 | B2* | 12/2019 | Cunico | G06F 16/9535 |
| 2003/0105642 | A1* | 6/2003 | Andino, Jr. | G06Q 10/105 705/321 |
| 2006/0036635 | A1* | 2/2006 | Williams | G06F 16/30 |
| 2008/0248873 | A1* | 10/2008 | Lang | G07F 17/32 463/40 |
| 2009/0164404 | A1* | 6/2009 | Sampath | G06Q 50/184 706/46 |
| 2009/0228323 | A1* | 9/2009 | Ebrahimian | G06Q 10/06 705/321 |
| 2016/0217139 | A1* | 7/2016 | Kapur | G06Q 10/10 |
| 2016/0217540 | A1* | 7/2016 | Lytkin | G06Q 30/0201 |

(Continued)

OTHER PUBLICATIONS

"Designing a Better Judging System", Reddit, Mar. 7, 2015, 11 pages, <https://www.anishathalye.com/2015/03/07/designing-a-better-judging-system/>.

(Continued)

*Primary Examiner* — William H McCulloch, Jr.
(74) *Attorney, Agent, or Firm* — Monchai Chuaychoo; Edward J Wixted, III (57) ABSTRACT

A method, system, and computer program product algorithmically analyzes scoring data from a competitive event where the scoring, determined by a plurality of evaluators, is based on subjective criteria. The method receives, and/or determines a scale factor associated with each evaluator. The method adjusts scores awarded by each evaluator, based on respectively corresponding scale factors, to arrive at normalized scores. The method, thereby minimizes influences of biases associated with the evaluators.

18 Claims, 6 Drawing Sheets

(56) References Cited

U.S. PATENT DOCUMENTS

| | | | | |
|---|---|---|---|---|
| 2016/0379170 | A1* | 12/2016 | Pande | G06Q 10/1053 |
| | | | | 705/321 |
| 2018/0190272 | A1* | 7/2018 | Georges | G10L 25/54 |
| 2018/0339213 | A1* | 11/2018 | Baughman | G06N 5/003 |
| 2018/0339214 | A1* | 11/2018 | Baughman | A63B 71/0605 |
| 2020/0030681 | A1 | 1/2020 | Wanke et al. | |
| 2021/0103876 | A1* | 4/2021 | Petrosso | G06Q 10/1053 |
| 2021/0220715 | A1* | 7/2021 | Colding | A63B 69/002 |
| 2021/0279668 | A1* | 9/2021 | Mikhajlov | A61B 5/1128 |
| 2021/0319334 | A1* | 10/2021 | Mitchell | G06Q 10/1053 |
| 2021/0334761 | A1* | 10/2021 | Thombre | G10L 13/02 |
| 2021/0350330 | A1* | 11/2021 | Howard, Jr. | G06N 5/04 |

OTHER PUBLICATIONS

"Judgement score regularization problem", Stack Exchange, printed Oct. 23, 2020, 2 pages, <https://stats.stackexchange.com/questions/184143/judgement-score-regularization-problem>.

"Science fair judging", Ask MetaFilter, Apr. 14, 2010, 5 pages, <http://ask.metafilter.com/151205/science-fair-judging>.

"System and method to detect most unbiased model version", An IP.com Prior Art Database Technical Disclosure, IP.com No. IPCOM000256871D, IP.com Electronic Publication Date: Jan. 7, 2019, 4 pages, <https://priorart.ip.com/IPCOM/000256871>.

Cheng et al., "A Normalized Scoring Model for Law School Competitions", Copyright 2013, 17 pages, <https://www.google.com/urlsa=t&rct=j&q=&esrc=s&source=web&cd=11&cad=rja&uact=8&ved=2ahUKEwiL3s6_9tTIAhWjmuAKHZrqDFIQFjAKegQIBBAC&url=https%3A%2F%2Fwww.lwionline.org%2Fsites%2Fdefault%2Ffiles%2F2017-09%2FCheng%2520Farmer%2520A%2520Normalized%2520Scoring%2520Model.pdf&usg=AQvVaw2jTDh_7QuwXu6ZycvycJur>.

Eolenka, "Bias in the AI court decision making—spot it before you fight it", Towards Data Science, Jun. 1, 2019, 17 pages, <https://towardsdatascience.com/bias-in-the-ai-court-decision-making-spot-it-before-you-fight-it-52acf8903b11>.

\* cited by examiner

| RANK | ENTRY | J1 ID | J2 ID | J1 RAW SCORE | J2 RAW SCORE | RAW SCORE | LF J1 | LF J2 |
|---|---|---|---|---|---|---|---|---|
| 1 | 20 | 10 | 25 | 51 | 51 | 102 | 0.890 | 0.882 |
| 2 | 9 | 1 | 2 | 51 | 49 | 100 | 0.798 | 0.822 |
| 3 | 19 | 10 | 25 | 51 | 49 | 100 | 0.890 | 0.882 |
| 4 | 36 | 1 | 2 | 50 | 49 | 99 | 0.753 | 0.758 |
| 5 | 21 | 10 | 25 | 49 | 48 | 97 | 0.890 | 0.882 |
| 6 | 49 | 10 | 25 | 48 | 47 | 95 | 0.748 | 0.727 |
| ⋮ | ⋮ | ⋮ | ⋮ | ⋮ | ⋮ | ⋮ | ⋮ | ⋮ |
| 15 | 1 | 3 | 4 | 43 | 43 | 86 | 0.545 | 0.49 |
| ⋮ | ⋮ | ⋮ | ⋮ | ⋮ | ⋮ | ⋮ | ⋮ | ⋮ |
| 45 | 3 | 3 | 4 | 27 | 30 | 57 | 0.545 | 0.49 |
| 46 | 46 | 19 | 20 | 25 | 29 | 54 | 0.59 | 0.678 |
| 47 | 43 | 15 | 16 | 25 | 25 | 50 | 0.66 | 0.66 |
| 48 | 4 | 3 | 4 | 25 | 19 | 44 | 0.545 | 0.49 |
| 49 | 2 | 3 | 4 | 23 | 15 | 38 | 0.545 | 0.49 |
| 50 | 37 | 11 | 12 | 0 | 0 | 0 | 0.753 | 0.758 |

FIG. 4

| SCORING CATEGORY, 502 | A | B | C | D | E | TOTAL |
|---|---|---|---|---|---|---|
| MAXIMUM SCORE, 504 | 10 | 10 | 10 | 15 | 10 | 55 |

| | | | A | B | C | D | E | |
|---|---|---|---|---|---|---|---|---|
| JUDGE 10 | ALL ENTRIES | AVG SCORE 506 | 8.5 | 8.5 | 9 | 13.5 | 9.5 | |
| | ENTRY 20 | RAW SCORE 508 | 9 | 9 | 9 | 14 | 10 | |
| | | ADJUSTED SCORE 510 | 5.294 | 5.294 | 5.000 | 7.778 | 5.263 | 29 ← 518 |
| JUDGE 25 | ALL ENTRIES | AVG SCORE 512 | 8.5 | 8.75 | 8 | 13.35 | 10 | |
| | ENTRY 20 | RAW SCORE 514 | 9 | 9 | 9 | 14 | 10 | |
| | | ADJUSTED SCORE 516 | 5.294 | 5.143 | 5.625 | 7.865 | 5.000 | 29 ← 519 |
| | | | | | | | FINAL SCORE | 58 ← 520 |

FIG. 5A

| SCORING CATEGORY, 502 | A | B | C | D | E | |
|---|---|---|---|---|---|---|
| MAXIMUM SCORE, 504 | 10 | 10 | 10 | 15 | 10 | |

| | | | A | B | C | D | E | |
|---|---|---|---|---|---|---|---|---|
| JUDGE 10 | ALL ENTRIES | AVG SCORE 506 | 8.5 | 8.5 | 9 | 13.5 | 9.5 | 542 |
| | ENTRY 20 | LENIENCY FACTOR 530 | 0.850 | 0.850 | 0.900 | 0.900 | 0.950 | 0.890 |
| JUDGE 25 | ALL ENTRIES | AVG SCORE 512 | 8.5 | 8.75 | 8 | 13.35 | 10 | |
| | ENTRY 20 | LENIENCY FACTOR 532 | 0.850 | 0.875 | 0.800 | 0.890 | 1.000 | 0.883 |
| JUDGE 3 | ALL ENTRIES | AVG SCORE 534 | 5.5 | 6 | 5.25 | 6.75 | 6 | |
| | ENTRY 2 | LENIENCY FACTOR 536 | 0.550 | 0.600 | 0.525 | 0.450 | 0.600 | 0.545 |
| JUDGE 4 | ALL ENTRIES | AVG SCORE 538 | 5.5 | 6 | 3.75 | 6.75 | 4.75 | |
| | ENTRY 2 | LENIENCY FACTOR 540 | 0.550 | 0.600 | 0.375 | 0.450 | 0.475 | 0.490 |

DETECTING AND REMOVING BIAS IN SUBJECTIVE JUDGING

BACKGROUND

The present invention relates generally to the field of data analysis, and more particularly to minimizing scoring bias in competitive events where subjective judging is a factor.

In some fields, people are tasked with judging the product of researchers, experimenters, writers, scientists, inventors, students, etc., with the objective of determining a degree of merit that should be given to each product. Examples include, without limitation: (i) judges at a science fair may have to select the top three entries out of all entries presented; (ii) technical journal peer review where judges have to select, from among submitted research papers, which one(s) to publish; (iii) market researchers attempting to interpret customer feedback on new products; (iv) normalizing employee performance evaluations by different managers within an organization; and (v) judges who evaluate student essays associated with college admissions testing, and typically evaluate only a small subset of essays submitted. Biases can enter into any subjective judging process, where the judge may be unaware of biases he or she may bring into the process.

SUMMARY

According to an aspect of the present invention, there is a method, computer program product and/or system for mitigating effects of subjective evaluation bias in a competitive scoring event, that performs the following operations (not necessarily in the following order): (i) receiving, from a scoring system, a scoring dataset, with respect to a subjectively evaluated competitive event comprising a plurality of entries including a first entry and a second entry, and a plurality of scores awarded to respectively corresponding entries of the plurality of entries, the scoring dataset comprising: (a) scoring information, determined by a plurality of evaluators, including a first evaluator, wherein the scoring information includes a first score associated with the first entry scored by the first evaluator, and (b) evaluator metric information with respect to the plurality of evaluators, including first metric information corresponding to the first evaluator; (ii) determining, based on the scoring information in combination with the evaluator metric information, a first scale factor associated with the first evaluator; (iii) generating a first adjusted score based on a combination of the first score and the first scale factor; (iv) generating a modified scoring dataset based on the first adjusted score; and (v) sending the modified scoring dataset to the scoring system.

DETAILED DESCRIPTION

Some embodiments of the present invention comprise a method, computer program product and/or computer system that algorithmically analyzes scoring data from a competitive event, where scoring is based, at least in part, on subjective criteria. Using mathematical techniques, the method determines whether judging bias may be present in scoring results, and normalizes the scores to reduce, minimize, and/or remove effects of potential judging bias.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
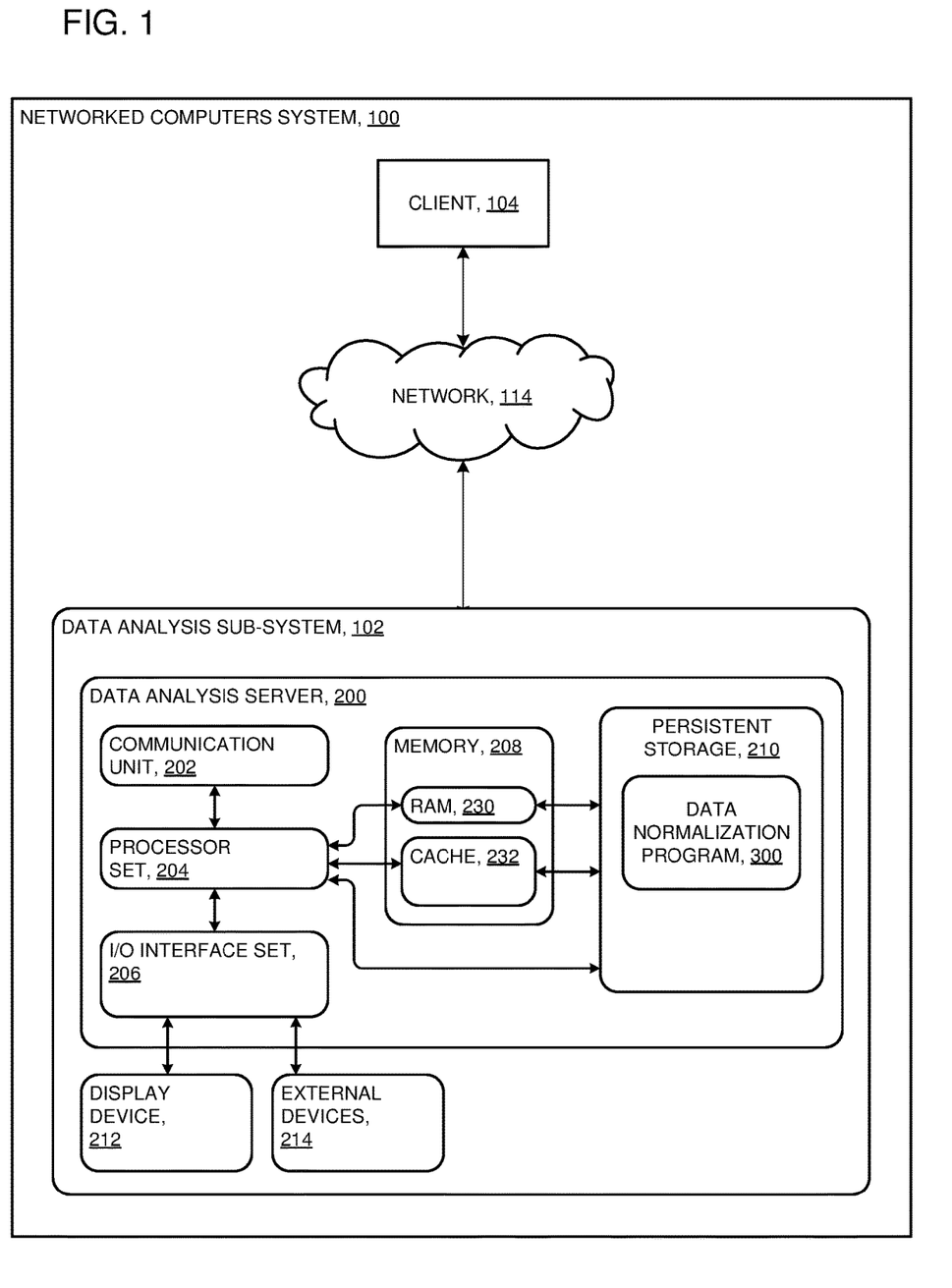
FIG. 1 is a block diagram of a system in accordance with at least one embodiment of the present invention.

An embodiment of a possible hardware and software environment for software and/or methods according to the present invention will now be described in detail with reference to the Figures. FIG. 1 is a functional block diagram illustrating various portions of networked computers system 100, including: data analysis sub-system 102; client computer 104; communication network 114; data analysis server 200; communication unit 202; processor set 204; input/output (I/O) interface set 206; memory 208; persistent storage 210; display device 212; external devices 214; random access memory (RAM 230); cache 232; and program 300.

Data analysis sub-system 102 is, in many respects, representative of the various computer sub-system(s) in the present invention. Accordingly, several portions of data analysis sub-system 102 will now be discussed in the following paragraphs.

Data analysis sub-system 102 may be a laptop computer, tablet computer, netbook computer, personal computer (PC), a desktop computer, a personal digital assistant (PDA), a smart phone, or any programmable electronic device capable of communicating with the client sub-systems via communication network 114. Program 300 is a collection of machine readable instructions and/or data that is used to create, manage, and control certain software functions that will be discussed in detail, below, in the Example Embodiment sub-section of this Detailed Description section.

Data analysis sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between server and client sub-systems.

Data analysis sub-system 102 is shown as a block diagram with many double arrows. These double arrows (no separate reference numerals) represent a communications fabric, which provides communications between various components of data analysis sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external devices 214 may be able to supply, some or all, memory for data analysis sub-system 102; and/or (ii) devices external to data analysis sub-system 102 may be able to provide memory for data analysis sub-system 102.

Program 300 is stored in persistent storage 210 for access and/or execution by one or more of the respective computer processor set 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communication unit 202, in these examples, provides for communications with other data processing systems or devices external to data analysis sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage 210) through a communications unit (such as communication unit 202).

I/O interface set 206 allows for input and output of data with other devices that may be connected locally in data communication with data analysis server 200. For example, I/O interface set 206 provides a connection to external devices 214. External devices 214 will may include devices such as a keyboard, keypad, a touch screen, and/or some other suitable input device. External devices 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments, the relevant software may (or may not) be loaded, in whole or in part, onto persistent storage 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature, herein, is used merely for convenience, and, thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
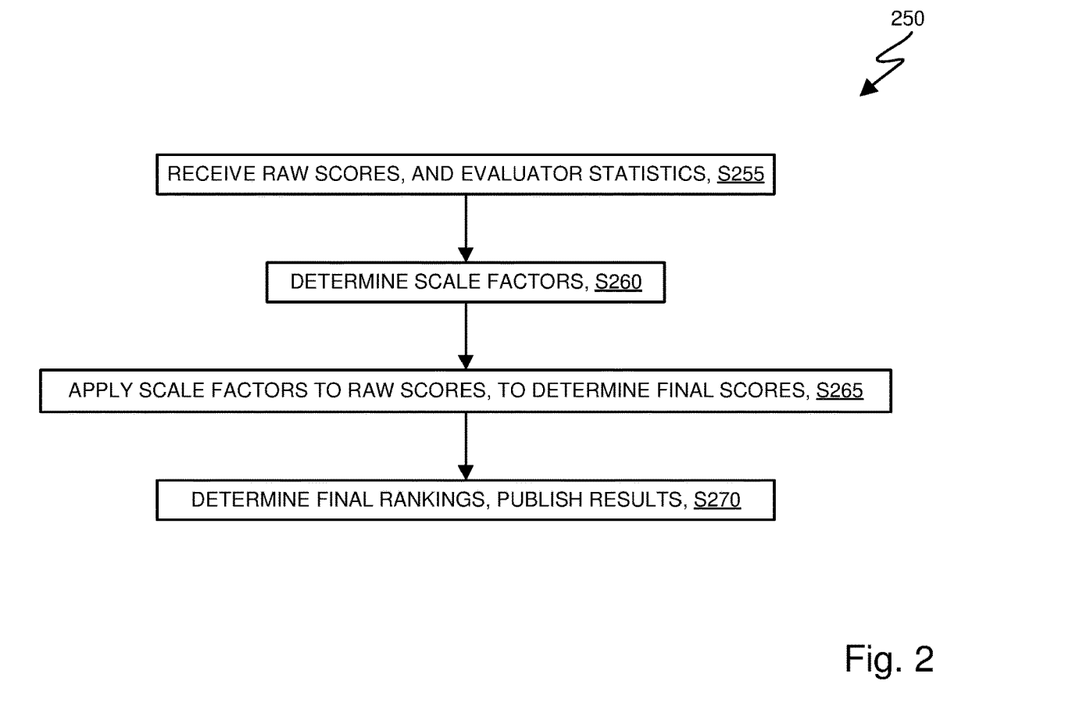
FIG. 2 is a flowchart showing a method performed, at least in part, in accordance with at least one embodiment of the present invention.
Figure 3:
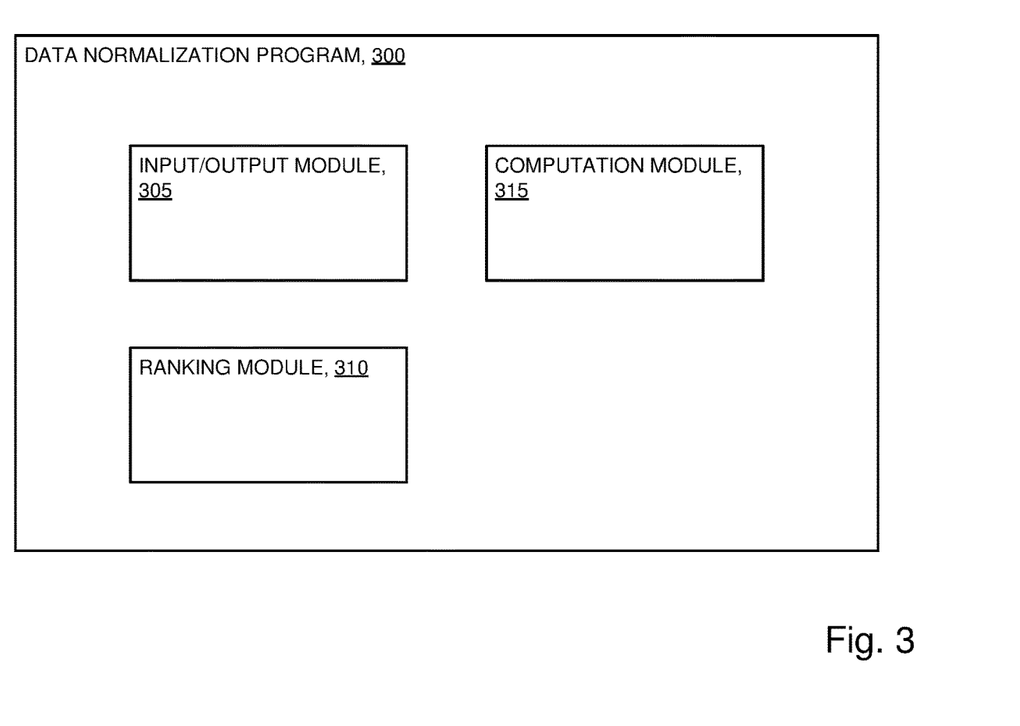
FIG. 3 is a block diagram showing a machine logic (for example, software) portion of a system in accordance with at least one embodiment of the present invention.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where input/output module 305, of data normalization program 300 receives a dataset comprising subjective scoring result information determined by a plurality of evaluators, with respect to a plurality of entries in a competitive scoring event.

Processing proceeds at operation S260, where computation module 315, of data normalization program 300, determines scaling factor information with respect to the scoring result information.

Processing proceeds at operation S265, where ranking module 310, of data normalization program, generates a ranking information dataset with respect to the plurality of entries, based on the scaling factor information.

Processing proceeds at operation S270, where input/output module 305, sends the ranking information dataset to a receiving system.

III. Further Comments and/or Embodiments

Some embodiments of the present invention are applicable to many different fields that involve subjective judging, such as science fair projects or presentations, technical journal peer reviews, manuscript evaluation for publication decisions, competitions involving certain sports, music, literature, artistic expression, culinary arts, engineering and packaging design, etc., to name just a few. For simplicity, discussion herein will be focused mainly on an example competitive event, where twenty presentations are made by entrants in a technical design challenge. Two judges evaluate each presentation in five categories. The product submitted by each entrant is hereinafter referred to interchangeably as a "presentation" or an "entry". Each judge evaluates four entries.

In some events, such as a science fair or technical design challenge, judging criteria may include: technical content; completeness; supporting data; visual, verbal, and/or apparatus presentation; relevance; quality-vs-quantity; entrant subject matter knowledge; correctness of data interpretation; inventiveness; reproducibility; practicality; interpretation of experimental results; application of scientific method, etc.

In a subjective evaluation process, results are generally based foremost on the presentation itself. Yet several factors external to the presentation may impact the results. External factors may include, without limitation: (i) subject matter expertise of each evaluator (sometimes herein referred to as a judge); (ii) a judge's evaluation temperament and approach (lenient, strict, or neither excessively lenient nor excessively strict but somewhere in between); and/or (iii) content of the entries assigned to a judge (sometimes it is impractical for every judge to evaluate every entry, and therefore each judge is assigned a subset of the entries to evaluate), etc. As a result of influence from the above factors, and others, it may happen that different judges are inclined to award different evaluation scores to the same presentation. A score assigned to an entry may be influenced in part by which judge, or combination of judges, are selected to evaluate the entry. As referred to herein, this is termed judging bias (which is not necessarily intentional).

Figure 4:
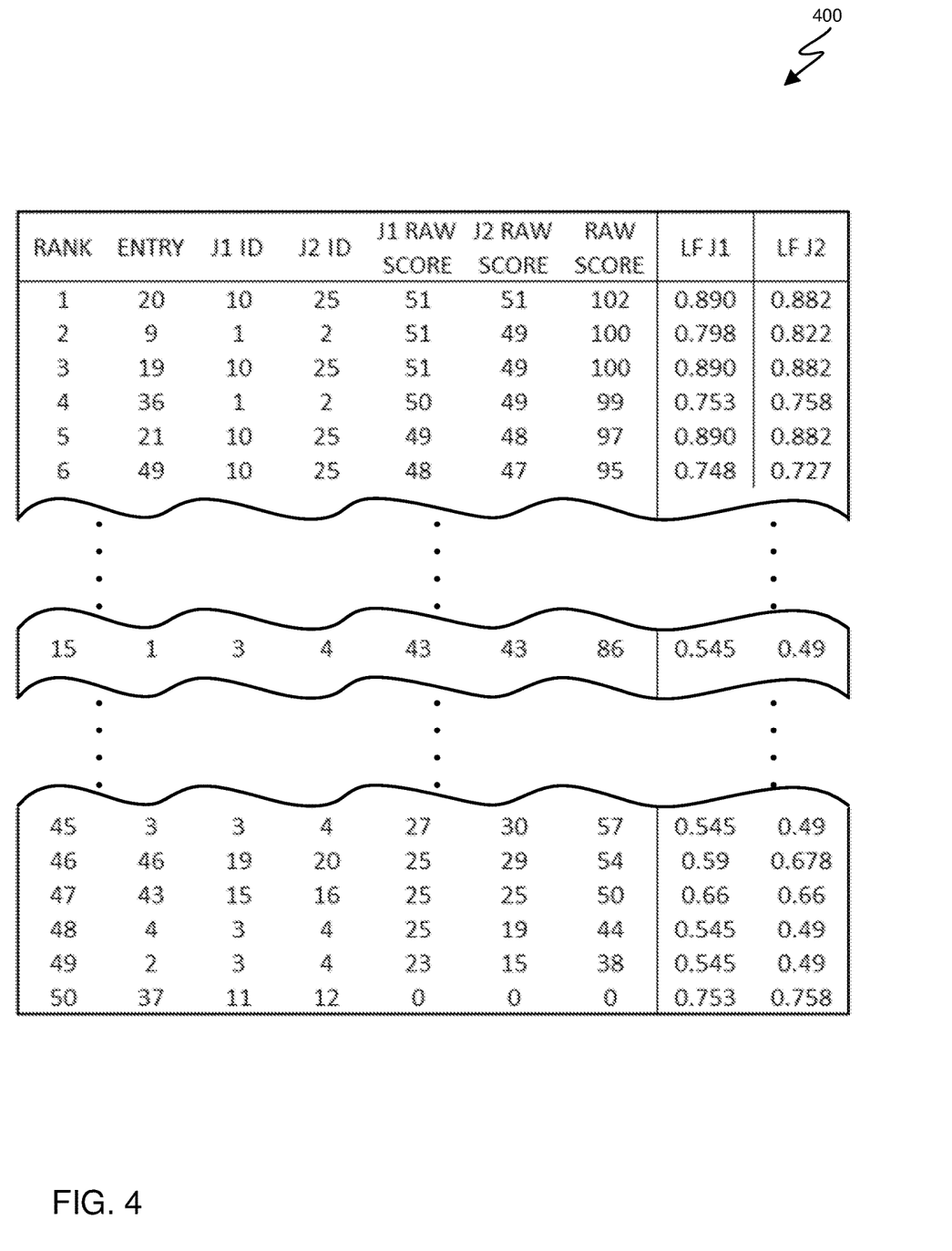
FIG. 4 is a table showing information that is generated by embodiments of the present invention.

Table 400, of FIG. 4, presents data showing a subset of raw (non-adjusted) judging results from a fictitious technical design competition event comprising 50 entries. In this example, twenty-five judges participate. Each judge evaluates four entries. Two judges independently evaluate each entry in five categories. The maximum score in each of the five categories is respectively 10, 10, 10, 15, and 10. An entry could be awarded a maximum score of 55 points from each judge, and 110 from the combined scores awarded by both judges.

Columns of table 400, from left to right are as follows:

RANK—standing of the 50 entries relative to one another, from 1 to 50, with 1 being the highest scored entry, and 50 being the lowest. For example, entry 20 is ranked #1 and entry 2 is ranked #49.

ENTRY—identification number for each presentation;

J1 ID and J2 ID—identification numbers for two judges who evaluate each entry. For example, judges 3 and 4 evaluate entry 1, ranked #15. Note that judges J1 and J2 may be different judges for each entry. For example, judge 3 is J1 for entry 1, while judge 10 is J1 for entry 20;

J1 RAW SCORE and J2 RAW SCORE—scores awarded to each entry by judges J1 and J2 respectively. For example, judge 10 (J1), awards a score of 51 to entry 19, ranked #3, and judge 25 (J2) awards 49; and RAW SCORE—sum of the two scores awarded by the two judges for each entry. For example, entry 3, ranked #45, receives a total score of 27+30=57.

Based on the raw (non-adjusted) scores the following results emerge: entry 20, ranked #1, receives the highest raw score (102); entry 2, ranked #49, receives the lowest raw score (38) (disregarding entry 37 which is a no-show); all four entries evaluated by judges 10 and 25 (entries 20, 19, 21, and 49) are ranked in the top six; and three of the four entries evaluated by judges 3 and 4 (entries 3, 4, and 2) are ranked in the bottom six. Given this raw data, a reasonable argument could be had as to whether judging bias factors into the results with any significant impact.

Figure 5A:
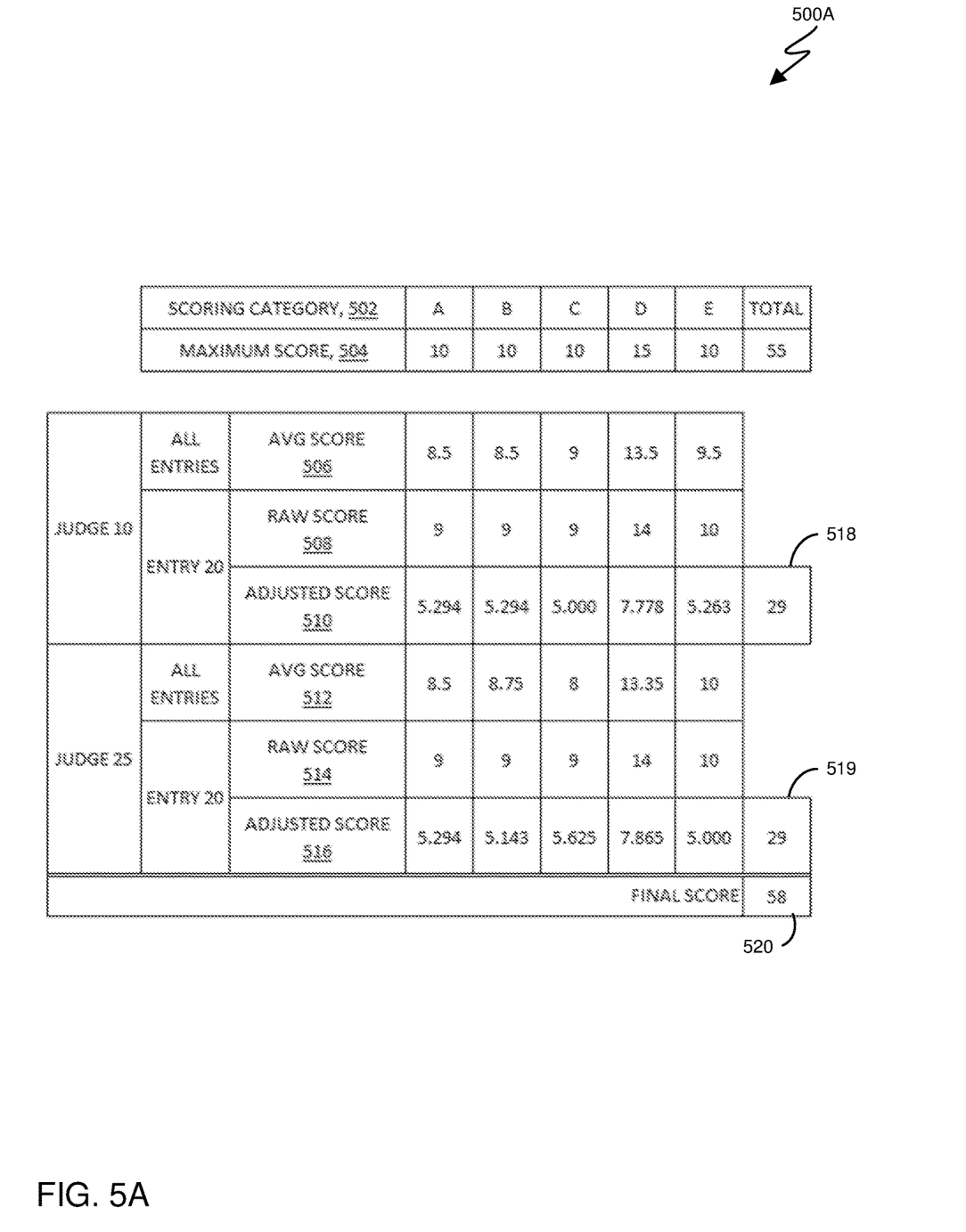
FIG. 5A is a table showing information that is generated by embodiments of the present invention.

Table 500A of FIG. 5A, shows scoring data that are helpful in understanding how raw scores are adjusted in accordance with some embodiments of the present invention, to normalize scores across judges and mitigate potential impact to the scoring caused by judging bias. Table 500A includes scoring data with respect to entry 20, evaluated by judges 10 and 25 (see FIG. 4, entry 20 ranked #1). Columns A, B, C, D, and E (row 502) correspond to five scoring categories. The maximum score that can be awarded by each judge (row 504) is 10 for categories A, B, C, and E, and 15 for category D. Maximum score, per judge, summed across all categories, is 55.

With respect to all entries evaluated by judges 10 and 25 (entries 20, 19, 21, and 49, see FIG. 4), category-specific averages of raw scores awarded are shown in row 506 (with respect to judge 10), and row 512 (with respect to judge 25).

Raw scores awarded for entry 20 are shown in row 508 (with respect to judge 10), and row 514 (with respect to judge 25).

Adjusted scores awarded for entry 20 are shown in row 510 (with respect to judge 10), and row 516 (with respect to judge 25).

A method, in accordance with some embodiments of the present invention, for computing adjusted scores (rows 510 and 516), now follows.

$$AdjScore = \left(\frac{RawScore}{AvgScore}\right) \times \left(\frac{MaxScore}{2}\right)$$

where:

Adj Score=adjusted score;

RawScore=score awarded by the judge;

MaxScore=maximum score awardable; and

AvgScore=arithmetic mean of scores awarded by a judge, to all entries evaluated by the judge. If a judge evaluates multiple entries in a contest that is scored in five categories, there will be five AvgScore values associated with the judge, one AvgScore for each of the five categories.

The partial expression $$\left(\frac{MaxScore}{2}\right)$$

is based on a statistical concept: "expected value". In an unbiased judging environment over a large sample size, the frequency distribution of scores could be expected to approximate a normal (Gaussian) distribution with a mean at approximately one-half MaxScore, hence $$\left(\frac{MaxScore}{2}\right).$$

By applying this concept, embodiments of the present invention normalize the scoring relative to the "expected value".

An example computation, according to the preceding method, follows. Referring again to table 500A, the adjusted score, based on the raw score awarded to entry 20 by judge 25, with respect to category D, for instance, is computed as follows:

$$\left(\frac{MaxScore}{2}\right) = \left(\frac{14}{13.35}\right) \times \left(\frac{15}{2}\right) = 7.865.$$

The total score per judge (cells 518 with respect to judge 10, and 519 with respect to judge 25), is the sum of the adjusted scores respectively associated with each judge for the entry in question (in the present example, entry 20). The final score (cell 520) is the sum of the total scores. Final results for an event are ranked according to the final scores.

Figure 5B:
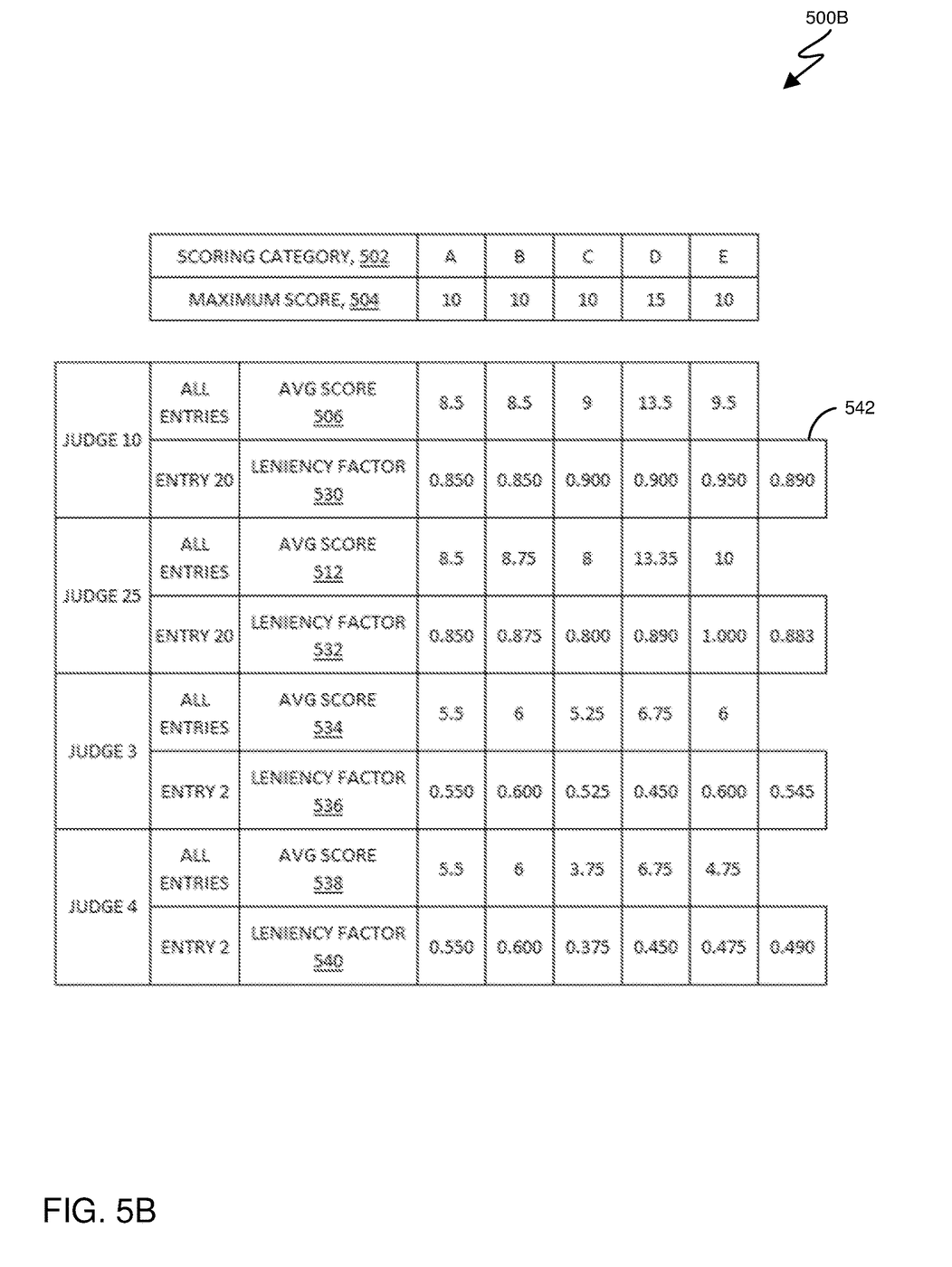
FIG. 5B is a table showing information that is generated by embodiments of the present invention.

Table 5B, of FIG. 5B, helps to show a method, in accordance with some embodiments of the present invention, for computing a "leniency factor" (LF) with respect to a judge. The leniency factor is an objective metric that may be used to detect and quantify a degree of bias affecting scores awarded by a given judge. However, the LF is one metric (of perhaps more) and only an indication, derived in accordance with some embodiments, based on scoring results. Factors other than biases may contribute to the LF. Therefore LF alone does not constitute proof of bias and should be interpreted merely as an indicator, perhaps one of several indicators.

In some embodiments, the LF is an arithmetic mean of category specific LFs associated with a judge. For example, judge 10, who evaluated entry 20, also evaluated several other entries, and awarded scores in five categories for each presentation (not shown in FIG. 5B). The averages of the category-specific scores appear in row 506. Similarly, category-specific scores for judges 25, 3, and 4 appear respectively in rows 512, 534, and 538.

Category-specific LFs are defined as $$LF = \frac{AvgScore}{MaxScore}$$

and are shown in rows 530, 532, 536, and 540, respectively corresponding to judges 10, 25, 3, and 4. For example, with respect to judge 10, LF in category A is computed as follows:

$$LF = \frac{AvgScore}{MaxScore} = \frac{8.5}{10} = 0.850.$$

LFs are computed in categories B, C, D, and E in like manner. The resultant leniency factor for judge 10 (0.890) is the arithmetic mean of the category-specific LFs, and is shown in cell 542. Category-specific and resultant LFs for the other judges are computed in like manner.

In some embodiments, a blended leniency factor, associated with an entry, is based on individual leniency factors associated with all judges who separately evaluated the entry. For example, if three judges score a given entry, and leniency factors LF1, LF2, and LF3 are respectively associated with the three judges, in at least one embodiment, the blended leniency factor comprises the arithmetic mean (average) of LF1, LF2, and LF3. In at least one embodiment, the blended leniency factor comprises a weighted average, where each individual leniency factor is weighted based on, for instance, the number of events in which the corresponding judge participated, the number of years in a relevant field, etc. For example, if three judges (who evaluate the same entry) are respectively associated with individual leniency factors 0.9, 0.4, and 0.8, and participated in 3, 0, and 4 past events respectively, the blended leniency factor is computed as follows:

$$\left(\frac{(0.9 \times 3) + (0.4 \times 0) + (0.8 \times 4)}{(3+0+4)}\right) = \frac{2.7 + 0.0 + 3.2}{7} = 0.843.$$

Some embodiments consequently divide this blended leniency factor into raw scores to arrive at adjusted (final) scores.

Figure 6:
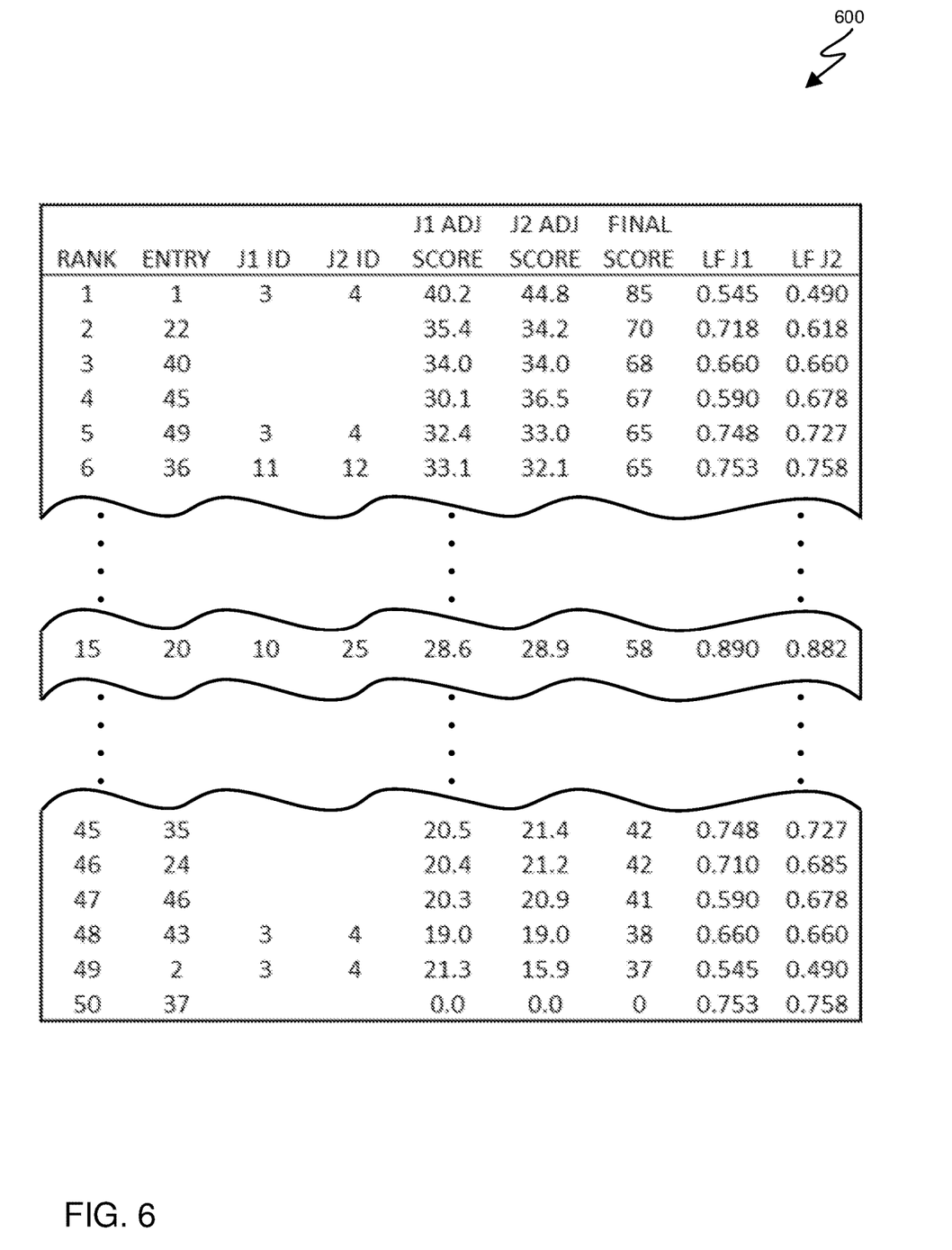
FIG. 6 is a table showing information that is generated by embodiments of the present invention.

Table 600 of FIG. 6 shows scoring results as described above with respect to FIG. 4, normalized according to computations described above with respect to FIG. 5A, and re-shuffled into a final ranking order. Columns of table 600, from left to right are as follows:

RANK—standing of 50 entries relative to one another, from 1 to 50, with 1 being the highest scored entry and 50 being the lowest, based on adjusted scores. For example, entry 20 is re-ranked #15 (originally ranked #1 based on raw scores, see FIG. 4);

ENTRY—identification number for each entry;

J1 ID and J2 ID—identification numbers for two judges who evaluated each entry. For example, entry 1, ranked #1, was evaluated by judges 3 and 4. Note that judges J1 and J2 may be different judges for each entry. For example, judge 3 is J1 for entry 1, while judge 10 is J1 for entry 20;

J1 ADJ SCORE and J2 ADJ SCORE—scores awarded to each entry by judges J1 and J2 respectively, adjusted by the method described above with respect to FIG. 5A. For example, for entry 36, ranked #6, judge 11 awards an adjusted score of 33.1, and judge 12 awards an adjusted score of 32.1;

FINAL SCORE—sum of the two adjusted scores. For example, entry 35, ranked 45, receives a final score of 20.5+21.4=42; and LF J1 and LF J2—leniency factors calculated with respect to judges J1 and J2 respectively. Leniency factor (LF) is a spectrum that ranges from 0 to 1 and represents leniency ranging respectively from very strict (the lower quartile, for example) to very lenient (the upper quartile, for example). Leniency factor is discussed above with respect to FIG. 5B.

In the data of table 400, it can be seen that entry 20 was judged by two "lenient" judges (LF J1=0.890 and LF J2=0.882). In contrast, entry 2 was judged by two relatively less lenient judges (LF J1=0.545 and LF J2=0.490).

Examination of tables 400 and 600 (FIG. 4 and FIG. 6 respectively) reveals at least the following observations: (i) entry 1 is ranked #15 according to raw scores and #1 according to adjusted scores; (ii) entry 20 is ranked #1 according to raw scores and #15 according to adjusted scores; (iii) entry 1 was scored by relatively strict judges and entry 20 was scored by relatively lenient judges. The above observations reveal that entry 1 was elevated in the rankings due to having been judged harshly by strict judges and entry 20 was moved down in the rankings due to having been judged leniently. The final rankings consequently are more reflective of true relative merit among the entries, absent significant influence caused by judging bias.

Some embodiments of the present invention employ post-processing of judging scores in a subjective judging environment, to mitigate or eliminate judging bias. Some embodiments compute and apply a scale factor (SF) and multiply raw scores by the SF to arrive at normalized scores.

A first embodiment method comprises the following: (i) normalizing the scoring across all judges (to ensure a consistent view of evaluation across all judges); and, (ii) normalizing the scores awarded by each judge (to ensure a consistent view of scores across all entries evaluated by each judge).

In some embodiments, a number of points is allocated to each judge for awarding to entries presented. A judge must award all allocated points, to ensure at least some degree of consistency in scoring across all judges. For example, consider a case where each judge is allocated five points for each presentation evaluated. If a judge evaluates four entries, the judge is expected to award 20 points (4×5=20) in total across the four presentations. The first embodiment method normalizes scores awarded by each judge, based on how the judge scored the four entries, to preserve the scoring distribution range intended for the event. If the judge awards fewer than 20 points, or more than 20, the scale factor (SF) normalizes the scores such that the total awarded by each judge adds up to 20. The scale factor is defined (in some embodiments) as $$SF = \left(\frac{\text{allocated points}}{\text{awarded points}}\right).$$

The following three examples serve to illustrate a scale process in accordance with some embodiments of the present invention:

Example 1: A (very "lenient") judge awards scores of [9, 10, 9, 8] to four entries. The scores total up to 36. Because the judge awarded more than the allocated 20 points, the method normalizes the scores based on the scale factor (in this case, downward). Consequently, $$SF = \left(\frac{\text{allocated points}}{\text{awarded points}}\right) = \left(\frac{20}{36}\right) \cong 0.556.$$

The final (normalized) scores therefore are: [(9×0.556), (10×0.556), (9×0.556), (8×0.556)]=[5.004, 5.556, 5.004, 4.448]. The normalized scores total up to the required 20 points instead of the awarded 36.

Example 2: A ("moderate") judge awards scores of [5, 9, 8, 4]. The scores total up to 26. Because the judge awarded more than the allocated 20 points, the method normalizes the scores based on the scale factor (in this case, downward). Consequently, $$SF = \left(\frac{\text{allocated points}}{\text{awarded points}}\right) = \left(\frac{20}{26}\right) \cong 0.769.$$

The final (normalized) scores therefore are: [(5×0.769), (9×0.769), (8×0.769), (4×0.769)]=[3.845, 6.921, 6.152, 3.076]. The normalized scores total up to the required 20 points instead of the awarded 26.

Example 3: A (very "strict") judge awards scores of [2, 3, 2, 4]. The scores total up to 11. Because the judge awarded fewer than the allocated 20 points, the method normalizes the scores based on the scale factor (in this case, upward). Consequently, $$SF = \left(\frac{\text{allocated points}}{\text{awarded points}}\right) = \left(\frac{20}{11}\right) \cong 1.818.$$

The final (normalized) scores therefore are: [(2×1.818), (3×1.818), (2×1.818), (4×1.818)]=[3.636, 5.454, 3.636, 7.272]. The normalized scores total up to the required 20 points instead of the awarded 11.

A second embodiment method pre-evaluates judges with respect to judging style and tendencies ("lenient", "moderate", "strict") by having the judges evaluate a set of presentations used for "training". The training presentations will not be presented at the event, but are of the same (or similar) subject matter and similar in other respects as well, such as having been created by a similar demographic (for instance, eighth grade biology students, or university graduate level civil engineering students) as are entrants to the event to be judged. The second embodiment, based on the results of the pre-evaluation, calculates a respective scale factor for each judge, and applies the scale factors (in like manner as the first embodiment described in the paragraph above) to modify the raw scores and produce final scores for the event.

A third embodiment method creates a database of judges and their respective scoring from past events. The database includes data, with respect to each judge, including features such as subject matter expertise, type of presentations evaluated, experience level, leniency tendencies, etc.). The method, based on information in the database, then: (i) creates a machine learning model; (ii) trains the model to predict judge-specific scale factors; (iii) applies the model to predict scale factors of judges at future events; and (iv) applies the predicted scale factors to the scoring at the future events.

A fourth embodiment method for computing a SF, associated with a judge, follows:

$$SF = \text{avgScore}/\text{maxScore};$$

where:

SF=is the scale factor associated with a given judge. In some embodiments, scoring is conducted in one or multiple categories, such as in the example above (with respect to FIGS. 5A and 5B) where scoring is conducted in five categories. Consequently, for each judge, a separate scale factor is computed for each category. In some embodiments, a single scale factor is computed for each judge. In some embodiments, the single scale factor is based on a combination (for example, an arithmetic mean, a root-mean-square, or any other suitable mathematical relationship) of separate scale factors respectively corresponding to multiple categories.

In some embodiments, avgScore is the average score awarded, by a judge, to all entries evaluated by the judge. For example, if a judge evaluates four entries, and awards respective scores of 5, 7, 4, and 3, avgScore=(5+7+4+3)/4=4.75;

In some embodiments, avgScore is the average score awarded by all judges combined, applied to all entries evaluated by a given judge; for example, if the given judge evaluates four entries, and the average score awarded to the four entries by all judges who evaluated the same four entries is 5, then avgScore=5;

In some embodiments, maxScore is the maximum score allowed for each entry as defined in evaluation rules for the event being judged; and In some embodiments, maxScore is the maximum score awarded across all event entries.

In some embodiments a scale factor that is: (i) close to 1 (unity) indicates a judge, who on average may tend to evaluate moderately; (ii) lower than unity indicates a judge who may tend to evaluate more leniently; and/or (iii) higher than unity indicates a judge who may tend to evaluate more strictly. In this embodiment, a raw score is multiplied by a scale factor to arrive at a final score. Consequently, the scale factor proportionately reduces a raw score awarded by a lenient judge (item (ii) above), and proportionately increases a raw score awarded by the strict judge (item (iii) above).

In some embodiments, scoring is performed by multiple automated systems where the automated systems are based on different evaluation algorithms, methods, and/or system types. For example, in an embodiment, the automated systems receive a photographic record (still pictures and/or video) of presentations submitted for scoring and/or ranking. In addition, the automated systems receive user input (including but not limited to natural language interaction) representing entrant interaction with the automated systems.

The automated systems use any combination of pattern recognition, image processing, natural language processing, subject matter reference information, etc., and process the information using artificial intelligence and/or other processing technology, to score and rank the presentations. Further, the automated systems comprise a mix of technologies, such as (separately, or in any combination) conventional computer systems, neural networks, quantum computing, human and/or machine generated algorithms, etc.

Scoring of each presentation is expected to yield different results from the different automated systems that conduct evaluation of the presentation. Moreover, for any given system, scores awarded to multiple presentations may be expected to exhibit different scoring frequency distribution than another system. These differences are considered to be evidence of "machine bias" among the various automated systems. Embodiments of the present invention are contemplated to mitigate such "machine bias".

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard as to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and/or application-specific integrated circuit (ASIC) based devices.

What is claimed is:

1. A computer-implemented method for mitigating effects of subjective evaluation bias in a competitive scoring event, the method comprising:
   receiving, from a scoring system, a scoring dataset, with respect to a subjectively evaluated competitive event comprising a plurality of entries including a first entry and a second entry, and a plurality of scores awarded to respectively corresponding entries of the plurality of entries, the scoring dataset comprising:
      scoring information, determined by a plurality of evaluators, including a first evaluator, wherein the scoring information includes a first score associated with the first entry scored by the first evaluator, and
      evaluator metric information with respect to the plurality of evaluators, including first metric information corresponding to the first evaluator;
   determining, based on the scoring information in combination with the evaluator metric information, a first scale factor associated with the first evaluator;
   generating a first adjusted score based on a combination of the first score and the first scale factor;
   generating a modified scoring dataset based on the first adjusted score;
   sending the modified scoring dataset to the scoring system;
   creating a machine learning model from the modified scoring dataset and the scoring dataset;
   training the machine learning model to predict judge-specific scale factors; and
   applying the judge-specific scale factors at future competing scoring events.

2. The method of claim 1, further comprising:
   normalizing the plurality of scores, awarded by the plurality of evaluators, to respectively corresponding entries of the plurality of entries, across the plurality of evaluators based, at least in part, on the plurality of scores.

3. The method of claim 1, further comprising:
   normalizing a plurality of scores, awarded by the first evaluator to a subset of entries of the plurality of entries, across the subset of entries based, at least in part, on the plurality of scores.

4. The method of claim 1, wherein the first metric information is based on scores awarded by the first evaluator in at least one past subjectively evaluated competitive event.

5. The method of claim 1, wherein the first metric information is based on a score, awarded by the first evaluator, to an example entry used for evaluator training.

6. The method of claim 1, wherein modifying the first score based on the first scale factor, and modifying the second score based on the second scale factor, to generate a modified scoring dataset comprises:
   multiplying the first score by the first scale factor to generate the adjusted first score;
   multiplying the second score by the second scale factor to generate the adjusted second score; and
   adding the first adjusted score and the second adjusted score to generate a final score associated with the first entry.

7. A computer program product for mitigating effects of subjective evaluation bias in a competitive scoring event comprising:
   one or more computer readable storage media, and program instructions collectively stored on the one or more computer readable storage media, the program instructions comprising instructions programmed to perform:
      receiving, from a scoring system, a scoring dataset, with respect to a subjectively evaluated competitive event comprising a plurality of entries including a first entry and a second entry, and a plurality of scores awarded to respectively corresponding entries of the plurality of entries, the scoring dataset comprising:
         scoring information, determined by a plurality of evaluators, including a first evaluator, wherein the scoring information includes a first score associated with the first entry scored by the first evaluator, and
         evaluator metric information with respect to the plurality of evaluators, including first metric information corresponding to the first evaluator;
      determining, based on the scoring information in combination with the evaluator metric information, a first scale factor associated with the first evaluator;
      generating a first adjusted score based on a combination of the first score and the first scale factor;
      generating a modified scoring dataset based on the first adjusted score;
      sending the modified scoring dataset to the scoring system;
      creating a machine learning model from the modified scoring dataset and the scoring dataset;
      training the machine learning model to predict judge-specific scale factors; and
      applying the judge-specific scale factors at future competing scoring events.

8. The computer program product of claim 7, further comprising instructions programmed to perform:
   normalizing the plurality of scores, awarded by the plurality of evaluators, to respectively corresponding entries of the plurality of entries, across the plurality of evaluators based, at least in part, on the plurality of scores.

9. The computer program product of claim 7, further comprising instructions programmed to perform:
   normalizing a plurality of scores, awarded by the first evaluator to a subset of entries of the plurality of entries, across the subset of entries based, at least in part, on the plurality of scores.

10. The computer program product of claim 7, wherein the first metric information is based on scores awarded by the first evaluator in at least one past subjectively evaluated competitive event.

11. The computer program product of claim 7, wherein the first metric information is based on a score, awarded by the first evaluator, to an example entry used for evaluator training.

12. The computer program product of claim 7, wherein modifying the first score based on the first scale factor, and modifying the second score based on the second scale factor, to generate a modified scoring dataset comprises instructions programmed to perform:
   multiplying the first score by the first scale factor to generate the adjusted first score;
   multiplying the second score by the second scale factor to generate the adjusted second score; and
   adding the first adjusted score and the second adjusted score to generate a final score associated with the first entry.

13. A computer system for mitigating effects of subjective evaluation bias in a competitive scoring event comprising:
   a processor set; and
   one or more computer readable storage media;
   wherein:
      the processor set is structured, located, connected and/or programmed to run program instructions stored on the one or more computer readable storage media; and
      the program instructions include instructions programmed to perform:
         receiving, from a scoring system, a scoring dataset, with respect to a subjectively evaluated competitive event comprising a plurality of entries including a first entry and a second entry, and a plurality of scores awarded to respectively corresponding entries of the plurality of entries, the scoring dataset comprising:
            scoring information, determined by a plurality of evaluators, including a first evaluator, wherein the scoring information includes a first score associated with the first entry scored by the first evaluator, and
            evaluator metric information with respect to the plurality of evaluators, including first metric information corresponding to the first evaluator;
         determining, based on the scoring information in combination with the evaluator metric information, a first scale factor associated with the first evaluator;
         generating a first adjusted score based on a combination of the first score and the first scale factor;
         generating a modified scoring dataset based on the first adjusted score;
         sending the modified scoring dataset to the scoring system;
         creating a machine learning model from the modified scoring dataset and the scoring dataset;
         training the machine learning model to predict judge-specific scale factors; and
         applying the judge-specific scale factors at future competing scoring events.

14. The computer system of claim 13, further comprising instructions programmed to perform:

normalizing the plurality of scores, awarded by the plurality of evaluators, to respectively corresponding entries of the plurality of entries, across the plurality of evaluators based, at least in part, on the plurality of scores.

15. The computer system of claim 13, further comprising instructions programmed to perform:
normalizing a plurality of scores, awarded by the first evaluator to a subset of entries of the plurality of entries, across the subset of entries based, at least in part, on the plurality of scores.

16. The computer system of claim 13, wherein the first metric information is based on scores awarded by the first evaluator in at least one past subjectively evaluated competitive event.

17. The computer system of claim 13, wherein the first metric information is based on a score, awarded by the first evaluator, to an example entry used for evaluator training.

18. The computer system of claim 13, wherein modifying the first score based on the first scale factor, and modifying the second score based on the second scale factor, to generate a modified scoring dataset comprises instructions programmed to perform:
multiplying the first score by the first scale factor to generate the adjusted first score;
multiplying the second score by the second scale factor to generate the adjusted second score; and
adding the first adjusted score and the second adjusted score to generate a final score associated with the first entry.

* * * * *